UNITED STATES PATENT OFFICE.

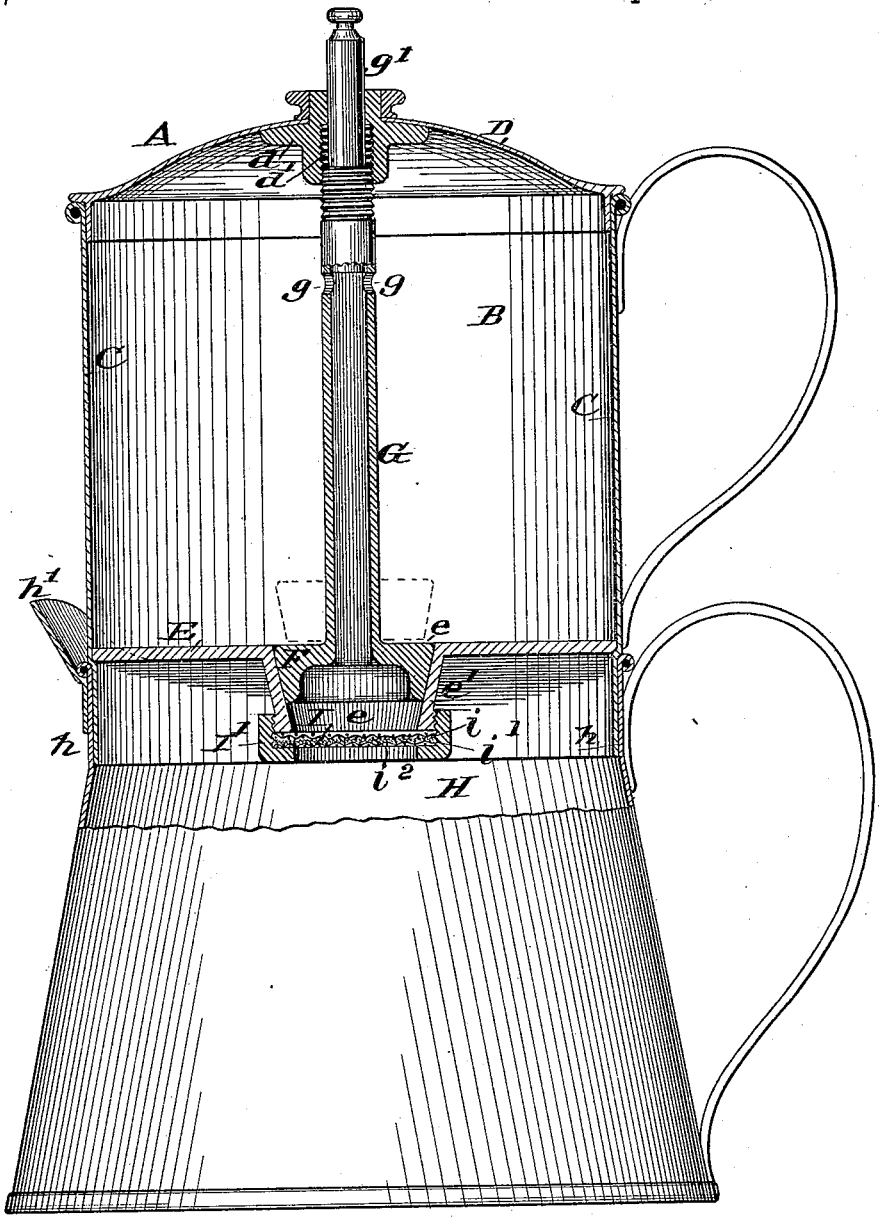

IGNAZ KAPPNER, OF ST. LOUIS, MISSOURI.

COFFEE-POT.

SPECIFICATION forming part of Letters Patent No. 246,785, dated September 6, 1881.

Application filed June 3, 1881. (No model.)

*To all whom it may concern:*

Be it known that I, IGNAZ KAPPNER, of St. Louis, Missouri, have made a new and useful Improvement in Coffee-Pots, of which the following is a full, clear, and exact description, reference being had to the annexed drawing, making part of this specification, in which the improvement is shown in sectional elevation.

By means of the present improvement the entire body of water used in making the coffee can be tightly inclosed in a chamber, with the ground roasted coffee from which the beverage is made, until the maceration is completed, whereupon, and without opening the utensil to the open air, the coffee can be strained into another chamber also inclosed from the outer air, and there retained until used, thus, in the first place, thoroughly and economically extracting the coffee without losing or wasting the aroma, and then, after making and straining the coffee, preserving its strength and flavor until used.

The improvement consists, mainly, in the combination of an upper and a lower chamber, each of the chambers being of sufficient capacity for holding all the water and coffee used at any one operation, and the upper chamber made to be tightly inclosed, having a tight wall, a tightly-fitting cover, and a tight bottom, saving that a valve is seated in the bottom for the purpose of discharging the liquid into the lower chamber after it shall have been prepared in the upper chamber. Until, however, the valve is lifted from its seat the bottom of the upper chamber is closed to the passage of the coffee, and the coffee is strained as it passes down into the lower chamber.

Referring to the drawing, A represents the improved coffee-pot. B represents the upper chamber, wherein the coffee is made, having a closed wall, C, a tightly-fitting cover, D, and a tight bottom, E, having an opening, $e$, in which seats a valve, F, and which, when seated, renders the bottom E practically tight. The chamber B is large enough to contain all the water and roasted ground coffee needed in making the coffee, beside making allowance in the upper chamber for the foaming incident to the operation.

The valve F is provided with a stem or handle, G, extending upward through the cover D, enabling the valve to be operated from without the chamber B. In place of simply perforating the cover D, and having the handle G fit smoothly in the perforation, the cover is preferably furnished with a collar, $d$, having a thread, $d'$, with which the valve-stem G engages, and the valve is operated by turning the stem in the collar.

H represents the lower or receiving chamber. When the valve F is lifted the contents of the upper chamber, B, can flow through the opening $e$ into the chamber H, which is made large enough to receive them. The chamber B is detachable from the chamber H, but is made to fit tightly into the latter and close it, the chamber H preferably not having any spout or other orifice below the level of the joint $h$ between the two chambers, but having a lip, $h'$, above such level, substantially as shown.

In operation the valve F is seated, closing the bottom E, and the ground roasted coffee and enough boiling-water for making the coffee placed in the upper chamber, B, and the utensil exposed to a mild heat, as when placed on the back part of a cooking-stove. The coffee and water are allowed to remain in contact in the upper chamber until the coffee has been macerated. Then by raising the valve F, but without uncovering the chamber B, the liquid is strained into the chamber H, the strainer I being conveniently located in the lower end of the passage $e$. The coffee is then ready for use, and after raising the chamber B from the lower chamber, H, can be poured from the lip $h'$.

To protect the utensil from the heat of the stove, and also to moisten the cloth of the strainer, it is desirable before commencing the operation to introduce a minute quantity of water through the upper chamber into the lower chamber, H.

The two chambers B and H are preferably connected, so that the steam from either chamber B or H can pass to the other chamber. For this purpose the stem G is made hollow, the openings $g$ from the upper end of the passage into the chamber B being above the level of the fluid therein, so that the latter shall not enter the passage within the stem.

The stem G is closed at its upper end, preferably being at that part g' of wood, and opposite the bearing in the cover D is covered with metal. The strainer I is conveniently held in place by the ring I', which is screwed onto the flange e', which depends from the bottom E around the opening e.

A float can be used in the chamber B to prevent excessive foaming of the coffee as it is being prepared. It is in the form of a disk, and is slipped onto the stem G after the coffee has been put into the chamber B and before the water has been poured onto it.

I claim—

1. A coffee-pot combining in its construction an upper and a lower chamber, the upper chamber being made to be tightly inclosed, and having an aperture in its bottom leading to the lower chamber, said aperture being closed by a valve, and a strainer being arranged beneath the valve, substantially as and for the purpose of making the coffee in the upper chamber, and then, and without opening that chamber to the open air, straining the coffee downward and discharging it into the lower chamber.

2. The combination of the upper chamber, B, the lower chamber, H, the valve F, the strainer I beneath the valve, and the stem G, extending and capable of being raised upward through the cover D, substantially as described.

3. The combination of the upper chamber, B, the lower chamber, H, the valve F, and the hollow stem G, as and for the purpose described.

4. The combination, in a coffee-pot, of an upper chamber, B, a lower chamber, H, and the tube G, opening at its lower end into the lower chamber at the upper part thereof, and at its upper end into the upper chamber at the upper part thereof, for the purpose described.

5. The combination of the flange e', ring I', and strainer I, composed of an upper and lower wire-cloth, i and i', and an interposed cloth, $i^2$, substantially as described.

IGNAZ KAPPNER.

Witnesses:
CHARLES D. MOODY,
SOLON N. SAPP.